US011822325B2

(12) United States Patent
Shao et al.

(10) Patent No.: US 11,822,325 B2
(45) Date of Patent: Nov. 21, 2023

(54) METHODS AND SYSTEMS FOR MANAGING A PIPE NETWORK OF NATURAL GAS

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/649,190

(22) Filed: Jan. 27, 2022

(65) Prior Publication Data

US 2022/0163958 A1   May 26, 2022

(30) Foreign Application Priority Data

Feb. 4, 2021   (CN) .......................... 202110154158.4
Jan. 14, 2022  (CN) .......................... 202210045160.2

(51) Int. Cl.
G05B 23/02        (2006.01)
G05B 13/04        (2006.01)

(52) U.S. Cl.
CPC ....... *G05B 23/0283* (2013.01); *G05B 13/047* (2013.01); *G05B 13/048* (2013.01); *G05B 2223/04* (2018.08); *G05B 2223/06* (2018.08)

(58) Field of Classification Search
CPC .... G06Q 10/0631; G06Q 50/06; G06Q 10/04; G06N 20/00; G06N 20/20;
(Continued)

(56) References Cited

U.S. PATENT DOCUMENTS 5,333,240 A  *  7/1994  Matsumoto ........... F01D 21/003
                                              706/904
10,578,543 B2 *  3/2020  Vasan ...................... E03B 7/075
(Continued)

FOREIGN PATENT DOCUMENTS

CN         109034413 A      12/2018
CN         111383130 A       7/2020
(Continued)

OTHER PUBLICATIONS

Mutiu et al., Recent Advances in Pipeline Monitoring and Oil Leakage Detection Technologies: Principles and Approaches, Sensors 2019, 19, 2548 (Year: 2019).*

(Continued)

*Primary Examiner* — John E Breene
*Assistant Examiner* — Xiuqin Sun
(74) *Attorney, Agent, or Firm* — METIS IP LLC

(57) ABSTRACT

The present disclosure provides a method for managing a pipe network of natural gas. The method may comprise: obtaining pipe network information of natural gas in at least one area, the pipe network information including a running time of a system of the pipe network of the natural gas and gas leakage information of the pipe network; extracting feature information based on the running time and the gas leakage information; predicting a maintenance time of the pipe network by inputting the feature information into a maintenance time prediction model.

9 Claims, 8 Drawing Sheets

(58) Field of Classification Search
CPC .............. G05B 23/0283; G05B 13/047; G05B 13/048; G05B 2223/04; G05B 2223/06
See application file for complete search history.

(56) References Cited

U.S. PATENT DOCUMENTS

| | | |
|---|---|---|
| 2010/0103041 A1 | 4/2010 | Tomita |
| 2015/0300909 A1* | 10/2015 | Giunta .................... G01M 7/00 |
| | | 702/56 |
| 2017/0082592 A1* | 3/2017 | Morrow .................. H04W 4/14 |
| 2019/0187678 A1* | 6/2019 | Muinda ............... G01M 5/0033 |
| 2019/0257675 A1* | 8/2019 | Lewis ...................... G01D 7/00 |
| 2019/0257700 A1* | 8/2019 | Lewis ................... G01K 13/02 |
| 2019/0257740 A1* | 8/2019 | Lewis ................. G01R 33/091 |
| 2019/0301963 A1* | 10/2019 | Yoshikawa ............ G06N 20/00 |
| 2019/0303791 A1* | 10/2019 | Yoshikawa ........ G06Q 10/0631 |
| 2020/0271277 A1* | 8/2020 | Lewis .................. G05D 1/0027 |

FOREIGN PATENT DOCUMENTS

| | | | | |
|---|---|---|---|---|
| CN | 112101662 A | | 12/2020 | |
| EP | 2628895 A1 | * | 8/2013 | .............. E21B 47/00 |
| EP | 3671201 A1 | * | 6/2020 | ............... F17D 5/06 |
| WO | WO-2015129031 A1 | * | 9/2015 | ............... E03B 7/02 |

OTHER PUBLICATIONS

Yue, Jiajia et al., Research on Comprehensive Evaluation of Equipment Life Cycle Management System, Equipment Management and Maintenance, 2016, 3 pages.

* cited by examiner

METHODS AND SYSTEMS FOR MANAGING A PIPE NETWORK OF NATURAL GAS

CROSS-REFERENCE TO RELATED APPLICATION

This application claims priority of Chinese Patent Application No. 202110154158.4, filed on Feb. 4, 2021, and Chinese Patent Application No. 202210045160.2, filed on Jan. 14, 2022, the contents of which are entirely incorporated herein by reference.

TECHNICAL FIELD

The present disclosure relates to the field of natural gas pipe network management, and more particularly to a method and a system for managing a pipe network of natural gas.

BACKGROUND

The pipe network of natural gas shoulders important tasks such as natural gas transmission and energy transportation day and night, and is an indispensable and important part of natural gas transmission. The management and control of pipe network life cycle of natural gas is an effective management and control of the natural gas equipment infrastructure. The existing pipe network management of natural gas mainly relies on personnel self-inspection. Self-inspection is difficult to detect pipe network problems in time, and maintenance is performed before the pipe network is damaged, which makes the management efficiency of the pipe network low.

Therefore, it is hoped to provide a method for managing a pipe network of natural gas by obtaining pipe network information of natural gas to predict the maintenance time of pipe network, thereby realizing the full life cycle intelligent management of pipe network of natural gas, prevent unnormal use because the pipe network of natural gas reaches a full life cycle, and avoiding serious losses.

SUMMARY

One of the embodiments of the present disclosure provides a method for managing a pipe network of natural gas, implemented on a computing device including a storage device and at least one processor, the method comprising: obtaining pipe network information of natural gas in at least one area, the pipe network information including a running time of a system of the pipe network of the natural gas and gas leakage information of the pipe network; extracting feature information based on the running time and the gas leakage information; predicting a maintenance time of the pipe network by inputting the feature information into a maintenance time prediction model.

One of the embodiments of the present disclosure provides a system for managing a pipe network of natural gas. The system comprising: at least one storage medium storing a set of instructions; at least one processor in communication with the at least one storage medium to execute the set of instructions to perform operations comprising: obtaining pipe network information of natural gas in at least one area, the pipe network information including a running time of a system of the pipe network of the natural gas and gas leakage information of the pipe network; extracting feature information based on the running time and the gas leakage information; predicting a maintenance time of the pipe network by inputting the feature information into a maintenance time prediction model.

One of the embodiments of the present disclosure provides a device for managing a pipe network of natural gas, the device includes at least one processor and at least one memory; the at least one memory is used to store computer instructions; the at least one processor is used to execute at least part of the instructions in the computer instructions to implement the above-mentioned method for managing a pipe network of natural gas. One of the embodiments of the specification provides a non-transitory computer readable medium storing instructions, when executed by at least one processor, causing the at least one processor to implement a method comprising: obtaining pipe network information of natural gas in at least one area, the pipe network information including a running time of a system of the pipe network of the natural gas and gas leakage information of the pipe network; extracting feature information based on the running time and the gas leakage information; predicting a maintenance time of the pipe network by inputting the feature information into a maintenance time prediction model.

One of the embodiments of the present disclosure provides a non-transitory computer readable medium storing instructions, when executed by at least one processor, causing the at least one processor to implement a method comprising: obtaining pipe network information of natural gas in at least one area, the pipe network information including a running time of a system of the pipe network of the natural gas and gas leakage information of the pipe network; extracting feature information based on the running time and the gas leakage information; predicting a maintenance time of the pipe network by inputting the feature information into a maintenance time prediction model.

One of the embodiments of the present disclosure provides a comprehensive management method and system for the life cycle of a natural gas energy metering Internet of Things. By receiving target system uptime information, the target system uptime information carries the predicted running time difference corresponding to the historical running time information and predicted damage period information; extracting time features based on the predicted running time difference and the predicted damage period information, and determining the actual running time difference corresponding to the predicted running time difference and the predicted damage period information for providing running services value and actual damage cycle information; sending the target system normal running time information to the actual running time difference value and the actual damage period information, so as to manage the system actual running time according to the target system normal running time information.

One of the embodiments of the present disclosure provides a comprehensive management method for the life cycle of a natural gas energy metering Internet of Things system, the method further comprising: before receiving the target system uptime information, the coefficient corresponding to the actual operating time of the receiving system; wherein, the coefficient value of the actual running time of the system is carried in the coefficient corresponding to the actual running time of the system; according to described coefficient value, assign described predicted running time difference value and described predicted damage period information to described system actual running time; according to described coefficient value, determine described actual running time difference value and described actual damage cycle information; adding the mapping relationship between the predicted running time difference, the predicted damage period information and the actual running time difference, the actual damage period information into the time feature; according to described coefficient value and described actual operation time difference value, described actual damage cycle information distribution described system actual running time and system actual running time mark.

One of the embodiments of the present disclosure provides a comprehensive management method for the life cycle of a natural gas energy metering Internet of Things system, the method further comprising: according to the coefficient value, assign the historical running time average value corresponding to the predicted running time difference value to the actual running time of the system; wherein the determining the actual running time difference value and the actual damage period information according to the coefficient value includes; for each actual damage period information, determine an actual running time difference and an actual damage period information according to the coefficient value; wherein the mapping relationship between the predicted running time difference, the predicted damage period information, the actual running time difference, and the actual damage period information is added to the time features include: adding the mapping relationship between the predicted damage period information and the historical running time average value into the time feature; adding the mapping relationship between the predicted running time difference, each actual damage period information, the actual running time difference corresponding to each actual damage period information, and the actual damage period information to the time feature.

One of the embodiments of the present disclosure provides a kind of natural gas energy metering Internet of Things system life cycle comprehensive management method, described according to the predicted running time difference value and predicted damage period information extraction time feature, determine the predicted running time difference The actual operating time difference and the actual damage period information used to provide the operating service corresponding to the value and the predicted damage period information, including: extracting time features from the predicted damage period information, and determining the actual running time difference value and actual damage period information corresponding to the predicted running time difference value and the predicted damage period information for providing the operation service, the specific operations may include: according to the mapping relationship between the predicted damage period information and the historical running time average value, determining the historical running time average value corresponding to the predicted damage period information; according to the historical running time average value, extracting time feature respectively, obtaining the actual running time difference and the actual damage period information corresponding to each actual damage period information.

One of the embodiments of the present disclosure provides a comprehensive management method for the life cycle of a natural gas energy metering Internet of Things system, the first running time calculation model is also carried in the coefficient corresponding to the actual running time of the system, and the described coefficient value is based on assigning the predicted run time difference and the predicted damage period information to the system actual run time, including: according to the coefficient value, the first running time calculation model to allocate the predicted running time difference value and the predicted damage period information for the actual running time of the system; determining the actual running time difference value and the actual damage period information according to the coefficient value, including: according to the coefficient value, the first running time calculation model to determine the actual running time difference value and the actual damage cycle information; adding the mapping relationship between the predicted running time difference, the predicted damage period information and the actual running time difference, and the actual damage period information into the time feature include; the mapping relationship between the predicted running time difference, the predicted damage period information and the actual running time difference, the actual damage period information, and the first running time calculation model add to the temporal feature.

One of the embodiments of the present disclosure provides a comprehensive management method for the life cycle of a natural gas energy metering Internet of Things system, the method further comprises; receiving replacement system time information, and described replacement system time information carries the second running time calculation model and system actual running time mark; determining the coefficient value of the actual running time of the system according to the actual running time of the system; according to the coefficient value and the second running time calculation model, assigning the actual damage period information and the actual damage parameter to the actual running time of the system; determining the replacement time error coefficient value corresponding to the actual running time difference value according to the coefficient value and the second running time calculation model; adding the mapping relationship between the actual damage period information, the actual damage parameter and the actual running time difference, the replacement time error coefficient value, and the second running time calculation model to the time feature.

One of the embodiments of the present disclosure provides a comprehensive management method for the life cycle of a natural gas energy metering Internet of Things system, the method further comprises, monitoring the state of the actual system running time corresponding to the system actual running time mark; when determining that the valid period corresponding to the actual running time of the system arrives, release the actual running time of the system; removing the mapping relationship described in the time feature.

One of the embodiments of the present disclosure provides a comprehensive management method for the life cycle of a natural gas energy metering Internet of Things system, the target system normal running time information also carries user identification, in according to described predicted running time difference value and described predicted damage period information extraction time feature, determining described predicted running time difference value and all before the actual running time difference and the actual damage period information corresponding to the predicted damage period information for providing the running service.

One of the embodiments of the present disclosure provides a comprehensive management method for the life cycle of a natural gas energy metering Internet of Things system, and the target system uptime information is a request for writing data, and the request for writing data further includes data to be written, the sending the target system uptime information to the actual running time difference value and the actual damage period information includes: Sending the data to be written to the actual operating time difference value and the actual damage period information to replace the data corresponding to the actual operating time identification of the system.

One of the embodiments of the present disclosure provides a life cycle integrated management system of a natural gas energy metering Internet of Things system, and the system includes: a user platform, a service platform, a management platform, a sensor network platform and a perception control platform. The user platform is communicatively connected to the service platform, the service platform is communicatively connected to the management platform, the management platform is communicatively connected to the sensor network platform, and the sensor network platform is communicatively connected to the perception control platform. The management platform further includes a data acquisition terminal and a data processing terminal, the data acquisition terminal and the data processing terminal are connected in communication, and the data processing terminal is specifically used for: receiving target system uptime information, the target system uptime information carries the predicted running time difference corresponding to the historical running time information and predicted damage period information; extracting time features based on the predicted running time difference and the predicted damage period information, and determining the actual running time difference corresponding to the predicted running time difference and the predicted damage period information for providing running services value and actual damage cycle information; sending the target system normal running time information to the actual running time difference value and the actual damage period information, so as to manage the system actual running time according to the target system normal running time information.

BRIEF DESCRIPTION OF THE DRAWINGS

The present disclosure will be further described in the form of exemplary embodiments, and these exemplary embodiments will be described in detail with the drawings. These embodiments are not restrictive. In these embodiments, the same number represents the same structure, in which.

DETAILED DESCRIPTION

Figure 1:
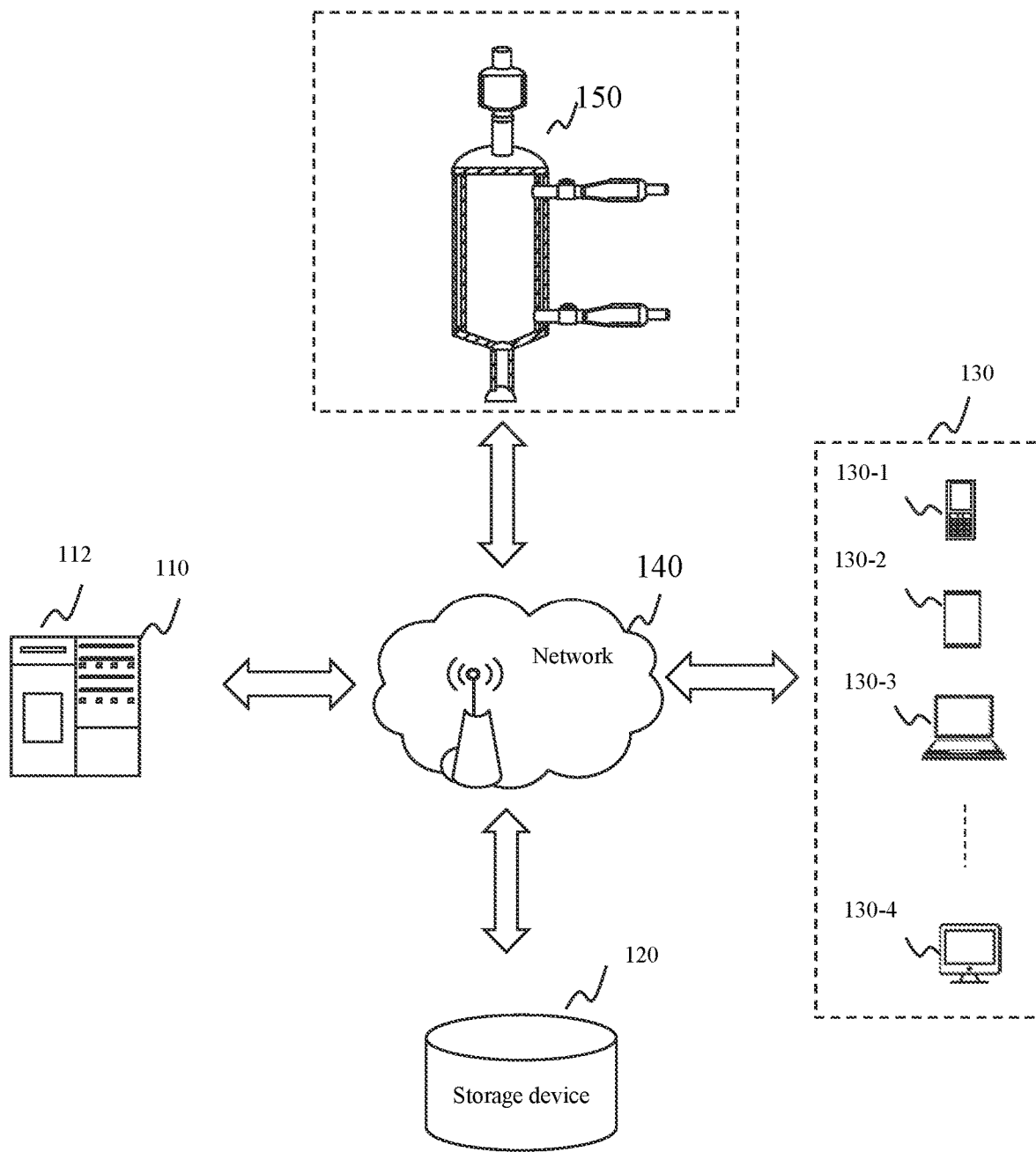
FIG. 1 illustrates an application scenario of a system for managing a pipe network of natural gas according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the disclosure. For those of ordinary skill in the art, without creative work, the disclosure can be applied to the application other similar scenarios according to these drawings. Unless it is obvious from the language environment or otherwise stated, the same reference numbers in the drawings represent the same structure or operation.

It should be understood that the "system", "device", "unit" and/or "module" used herein is a method for distinguishing different components, elements, parts, parts, or assemblies of different levels. However, if other words can achieve the same purpose, the words can be replaced by other expressions.

As shown in the present disclosure and the claims, unless the context clearly suggests exceptional circumstances, the words "a", "an", "an" and/or "the" do not specifically refer to the singular, but may also include the plural. Generally speaking, the terms "including" and "contain" only suggest that the operations and elements that have been clearly identified are included, and these operations and elements do not constitute an exclusive list, and the method or device may also include other operations or elements.

Flow diagram s are used in the present disclosure to illustrate the operations performed by the system according to the embodiments of the present disclosure. It should be understood that the preceding or following operations are not necessarily performed precisely in order. Instead, the individual operations can be processed in reverse order or simultaneously. At the same time, users can also add other operations to these processes, or remove an operation or several operations from these processes.

FIG. 1 illustrates an application scenario of a system 100 for managing a pipe network of natural gas according to some embodiments of the present disclosure. As shown in the application scenario, the system 100 may include a server 110, a processor 112, a storage device 120, a user terminal 130, a network 140, and a pipe network 150 of natural gas.

The system for managing a pipe network of natural gas may be used for the service platform for managing pipe network of natural gas, may realize the purpose of managing pipe network of natural gas by implementing the method and/or process disclosed in the present disclosure.

The server 110 may communicate with the processor 112, the storage device 120, and the user terminal 130 through the network 140 to provide various functions of managing pipe network of natural gas, and the storage device 120 may store all the information of the natural gas pipe network operation process. In some embodiments, the user terminal 130 may send a natural gas pipe network information acquisition request to the server 110 and receive feedback information from the server 110. The information transfer relationship between the above devices is only an example, and the present disclosure is not limited.

In some embodiments, the server 110, the user terminal 130, and other possible components may include the storage device 120.

In some embodiments, the server 110, the user terminal 130, and other possible components may include the processor 112.

The server 110 may be used to manage resources and process data and/or information from at least one component of the present system or an external data source (e.g., a cloud data center). In some embodiments, server 110 may be a single server or a group of servers. The server group may be centralized or distributed (e.g., the server 110 may be a distributed system), dedicated or concurrently provided by other devices or systems. In some embodiments, the server 110 may be regional or remote. In some embodiments, server 110 may be implemented on a cloud platform, or provided in a virtual fashion.

The processor 112 may process data and/or information obtained from other devices or system components. The processor may execute program instructions based on such data, information and/or processing results to perform one or more of the functions described herein. In some embodiments, the processor 112 may include one or more sub-processing devices (e.g., single-core processing devices or multi-core processing devices). In some embodiments, the processor 112 may be integrated with the server 110.

The storage device 120 may be used to store data and/or instructions. The storage device 120 may include one or more storage components, and each storage component may be an independent device or a part of other devices. In some embodiments, storage device 120 may include a random access memory (RAM), a read only memory (ROM), a mass memory, a removable memory, a volatile read-write memory, etc., or any combination thereof. Illustratively, mass memory may include magnetic disks, optical disks, solid state disks, or the like. In some embodiments, the storage device 120 may be implemented on a cloud platform.

The user terminal 130 refers to one or more terminal devices or software used by the user. In some embodiments, one or more users may use the user terminal 130, which may include users who directly use the service, and may also include other related users. In some embodiments, user terminal 130 may be one of mobile device 130-1, tablet computer 130-2, laptop computer 130-3, desktop computer 130-4, etc., and other devices with input and/or output capabilities species or any combination thereof.

The above examples are only used to illustrate the breadth of the scope of the user terminal 130 equipment rather than limit its scope.

The network 140 may connect components of the system and/or connect the system with external resource portions. The network 140 enables communication between the various components and with other components outside the system, facilitating the exchange of data and/or information. In some embodiments, the network 140 may be any one or more of a wired network or a wireless network. In some embodiments, the network may be in point-to-point, shared, centralized, etc. various topologies or a combination of a plurality of topologies. In some embodiments, network 140 may include one or more network access points. For example, network 140 may include wired or wireless network access points through which one or more components of the natural gas network management system may be connected to network 140 to exchange data and/or information.

The pipe network 150 of natural gas refers to a network of pipe that transport natural gas from extraction sites or processing plants to urban gas distribution centers or users. In some embodiments, the pipe network 150 of natural gas may include gas gathering pipes, gas transmission pipes, gas distribution pipes, or the like. The gas gathering pipe refers to the pipe from the gas field wellhead device through the gas gathering station to the gas treatment plant or the starting gas compressor station, which is used to collect the untreated natural gas extracted from the formation. The gas pipe refers to the pipe from the gas processing plant or the starting point compressor station of the gas source to the gas distribution centers, large users or gas storages in major cities, and the pipes that communicate with each other between the gas sources. It is used to transport natural gas that has been processed to meet pipeline quality standards. The gas distribution pipe refers to the pipe from the urban pressure regulating and measuring station to the user branch line. In some embodiments, the pipe network 150 of natural gas may be assembled from individual pipes connected one by one.

It should be noted that the above descriptions of the application scenarios of the system for managing pipe network of natural gas are only for convenience of description, and cannot limit the present disclosure to the scope of the illustrated embodiments. It can be understood that for those skilled in the art, after understanding the principle of the system, it is possible to arbitrarily combine various components, or form subcomponents to connect with other components without departing from this principle. In some embodiments, the server, the processor, and the memory disclosed in FIG. 1 may be different units in one component, or may be one component that implements the functions of the above-mentioned two or more components. For example, each component may share one storage unit, and each component may also have its own storage unit. Such deformations are within the scope of protection of this manual.

Figure 2:
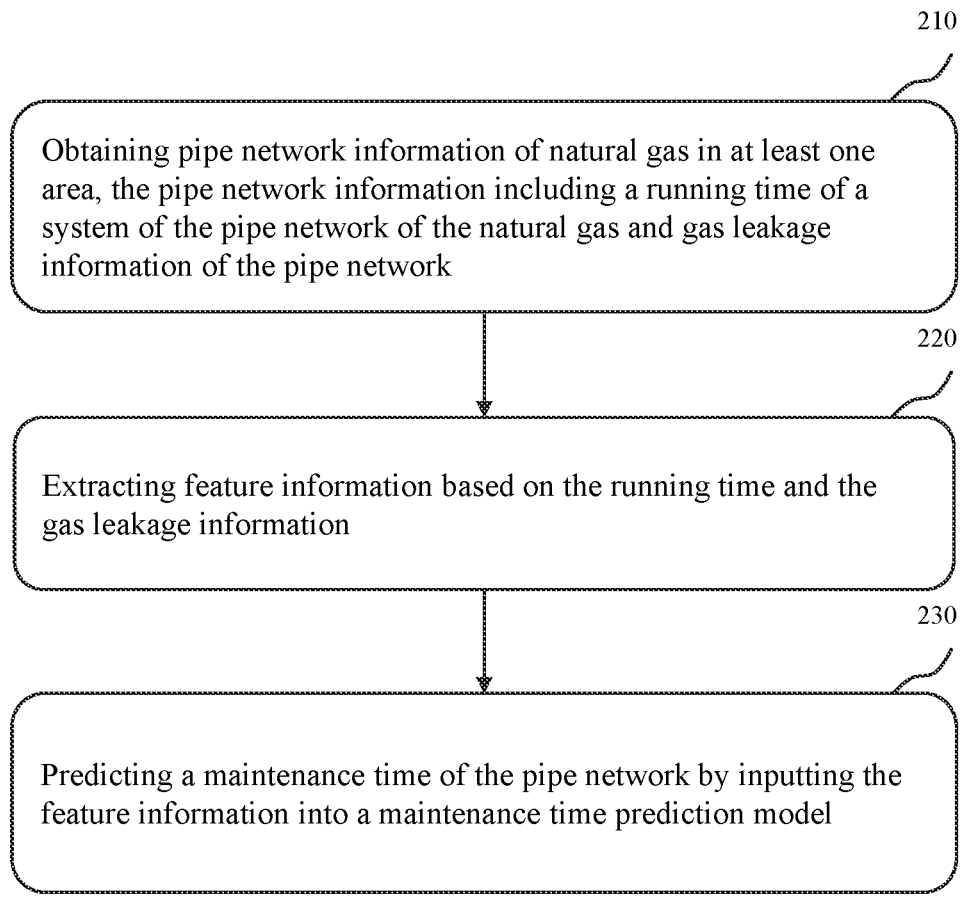
FIG. 2 illustrates an exemplary flow diagram of a method for managing a pipe network of natural gas according to some embodiments of the present disclosure.

FIG. 2 illustrates an exemplary flow diagram of a method for managing a pipe network of natural gas according to some embodiments of the present disclosure. As shown in FIG. 2, the process 200 may include the following operations. In some embodiments, process 200 may be executed by processor 112.

In operation 210, pipe network information of natural gas in at least one area may be obtained. In some embodiments, the information obtaining module 510 executes operation 210.

Among then, the area may be a district, a school, a city, or a certain specific area delineated, which may be determined according to actual management needs.

In some embodiments, the pipe network information of natural gas may include a running time of a system of the pipe network of the natural gas and gas leakage information of the pipe network.

The running time of the system refers to a time from a time point when the system for managing the pipe network of natural gas starts (which may include the first start or maintenance restart, etc.) to a time point when running time information of the system is collected, or a time from a time point when the system has been running since the end of the last maintenance to a time point when the running time information was collected. For example, if the system for managing the pipe network of natural gas was operated for the first time on Jan. 1, 2021, and has not been maintained until today, Feb. 1, 2021, the running time of the system is 31 days. For another example, if the system for managing the pipe network of natural gas was last maintained and restarted on Mar. 1, 2021, and it has not been maintained until Apr. 1, 2021, the running time of the system is 31 days.

The gas leakage information of the pipe network refers to information related to natural gas leakage. In some embodiments, the gas leakage information of the pipe network may include information such as a gas concentration, a diffusion rate, a leakage time, an elapsed time, and a gas leakage location of the leaked natural gas.

In some embodiments, the processor 112 may obtain the running time of the system based on historical information. The historical information may refer to various types of information collected and recorded in the past, including the running time of the system. In some embodiments, the processor 112 may obtain the gas concentration, diffusion rate, leakage time, and elapsed time of the leaked natural gas through the gas detector. In some embodiments, the processor 112 may obtain a gas leakage location of the leaked natural gas through the detection record of the leakage information. In some embodiments, the processor 112 may integrate information such as gas concentration, diffusion rate, leakage time, elapsed time, and gas leakage location of the leaked natural gas, so as to obtain the gas leakage information of the pipe network.

In operation 220, feature information based on the running time and the gas leakage information may be extracted. In some embodiments, the feature extracting module 520 executes operation 220.

The feature information may be an abstract expression obtained by means of feature extraction for the features of the system's running time and the gas leakage information. In some embodiments, the feature information may be in the form of feature vectors or matrices.

In some embodiments, feature information may be obtained by conversion algorithm, model processing, etc.

In some embodiments, the running time and the leakage information of the pipe network may be quantized to obtain the feature information. Specifically, a conversion algorithm may be used to determine the vector corresponding to the running time and the leakage information of the pipe network. The conversion algorithm may include a one-hot encoding algorithm, a collinear vector algorithm, a Glove algorithm, or the like. Exemplarily, the one-hot encoding algorithm may be used to convert the running time and the leakage information of the pipe network into a vector representation. The one-hot encoding, also known as one-bit valid encoding or one-hot encoding, mainly uses N-bit state registers to encode N states, each state has an independent register bit, and only one bit is valid at any time. The one-hot encoding is the representation of categorical variables as binary vectors. For example, assuming that the tag type includes running time and gas leakage information, according to the principle of encoding N states by the N-bit state register, where N=2, after encoding: the tag corresponding to the running time can be expressed as [1, 0], the label corresponding to the gas leakage information can be expressed as [0, 1].

In some embodiments, the vector corresponding to the running time and the gas leakage information of the pipe network may be spliced or superimposed to obtain an eigenvector or a matrix.

In some embodiments, the first model may be used to execute the running time and the gas leakage information of the pipe network to obtain feature information. For example, the running time and the gas leakage information of the pipe network may be input into the first model, and the feature information may be output from the first model. The first model may be a Word2Vec model, a BERT model, a CNN model, a DNN model, or the like. The first model may be trained by using the historical running time and the historical gas leakage information as training data, so that the first model may output its corresponding vector or matrix representation based on the running time and the gas leakage information. Labels corresponding to training data may be determined by transformation algorithms, human input, or historical data.

In operation 230, predicting a maintenance time of the pipe network by inputting the feature information into a maintenance time prediction model. In some embodiments, predicting module 530 executes operation 230.

The predicted maintenance time of the pipe network refers to the time point at which the pipe network is maintained and obtained through the prediction of the maintenance time prediction model. For example, today is Jan. 1, 2022, and the maintenance time of the pipe network obtained through the prediction of the maintenance time prediction model may be Jun. 30, 2022.

In some embodiments, after the feature information is input into the maintenance time prediction model, the maintenance time prediction model can output the predicted maintenance time of the pipe network.

In some embodiments, the maintenance time prediction model may be constructed based on a deep learning neural network model. Exemplary deep learning neural network models may include convolutional network models (CNN), fully convolutional neural network (FCN) models, generative adversarial networks (GAN), backpropagation (BP) machine learning models, radial basis functions (RBF) Machine Learning Model, Deep Belief Network (DBN), Elman Machine Learning Model, etc. or a combination thereof.

Figure 3:
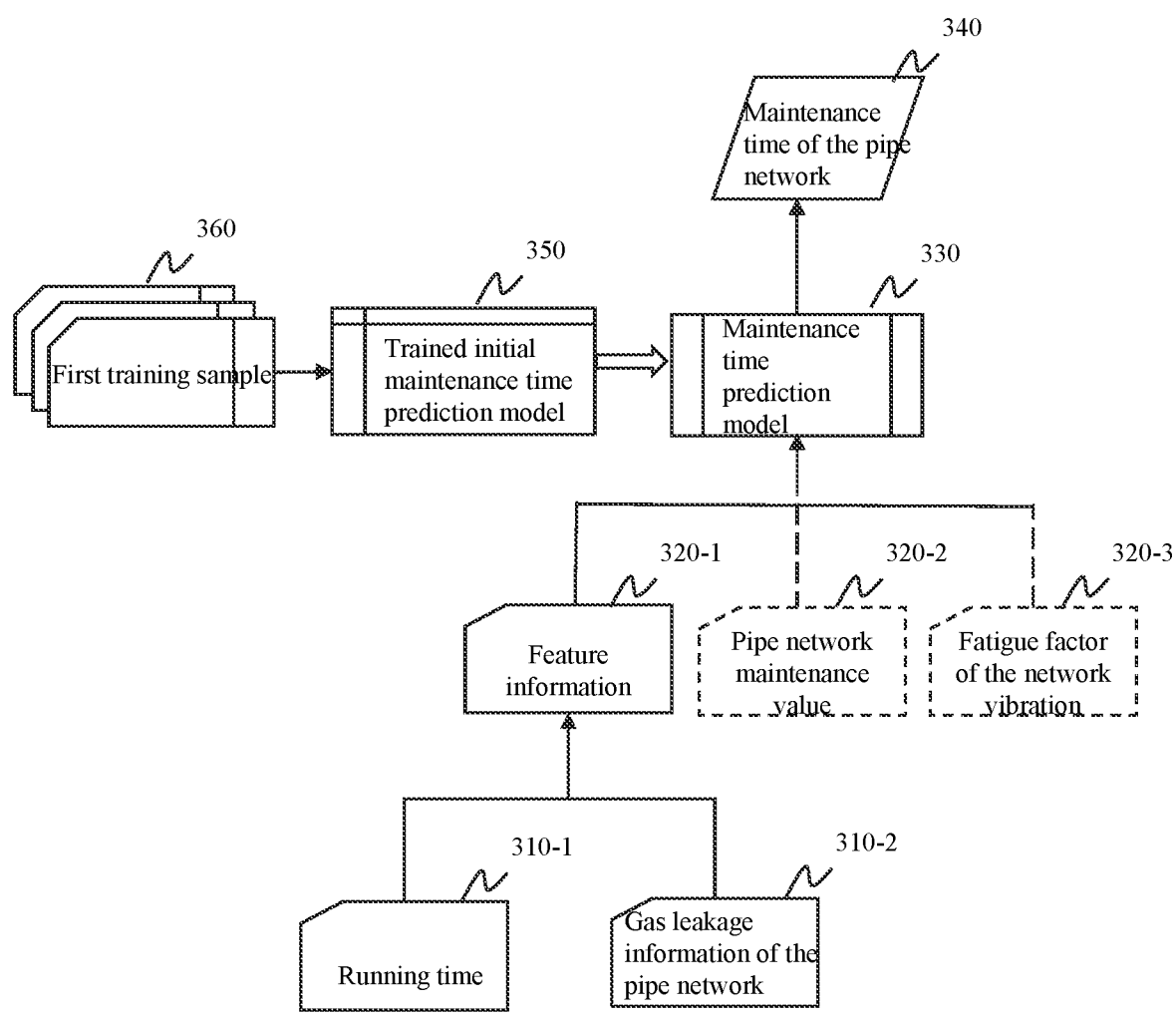
FIG. 3 illustrates an exemplary schematic diagram of a method for predicting maintenance time according to other embodiments of the present disclosure.

For more content about the maintenance time prediction model, refer to other parts of the present disclosure (for example, FIG. 3 and its related description).

By predicting the maintenance time of the pipe network, maintenance can be performed before the pipe network of natural gas is damaged, so as to prevent the underground pipe network from being unable to be used normally due to the full life cycle, thereby avoiding serious losses. In addition, the running time and the gas leakage information of the pipe network are used as the input of the pipe network maintenance time prediction model, and the accuracy of the prediction of the pipe network maintenance time may be improved by combining the running time and the gas leakage information.

FIG. 3 illustrates an exemplary schematic diagram of a method for predicting maintenance time according to other embodiments of the present disclosure. As shown in FIG. 3, the method 300 includes a running time 310-1, gas leakage information of the pipe network 310-2, feature information 320-1, a pipe network maintenance value 320-2, a vibration fatigue factor of the pipe network 320-3, a maintenance time prediction model 330 and the maintenance time of the pipe network 340, and also include the initial maintenance time prediction model 350 and the first training sample 360.

In some embodiments, as shown in FIG. 3, the input to the maintenance time prediction model 330 may be feature information 320-1. The feature information 320-1 may be obtained based on running time 310-1 and gas leakage information 310-2. For more information about the extraction of the feature information 320-1, refer to other parts of the present disclosure (for example, FIG. 2 and its related descriptions).

In some embodiments, the input of the maintenance time prediction model 330 may also include a pipe network maintenance value 320-2. The dashed boxes in FIG. 3 indicate optional.

The pipe network maintenance value may be a numerical value or a letter or the like that can reflect the maintenance processing priority. For example, the pipe network maintenance value may be represented by a numerical value between 1-10, or the letters a-f, or a star rating. The larger the value, the larger the dictionary order, or the higher the star rating, the higher the priority of maintenance processing.

In some embodiments, the pipe network maintenance value may be obtained based on pipe network maintenance information and pipe network environment information. In some embodiments, the pipe network maintenance value may be obtained through a maintenance value prediction model. For more information about the acquisition of the pipe network maintenance value, refer to other parts of the present disclosure (for example, FIG. 4 and its related descriptions).

In some embodiments, the input of the maintenance time prediction model 330 may also include a fatigue factor of the network vibration 320-3.

The vibration fatigue factor of the pipe network may be used to reflect the magnitude of the strength of the vibration fatigue of the pipe due to vibration. For example, the vibration factor of the pipe network may be represented by a value between 1 and 10. The larger the value, the greater the fatigue strength of the pipe due to vibration.

In some embodiments, the vibration fatigue factor of the pipe network may be obtained based on a vibration frequency of the pipe network and a vibration time of the pipe network. In some embodiments, the vibration fatigue factor of the pipe network may be directly calculated based on the vibration frequency of the pipe network and the vibration time of the pipe network. In some embodiments, the vibration fatigue factor of the pipe network may be obtained by inputting the vibration frequency of the pipe network and the vibration time of the pipe network into the second model, and outputting the vibration fatigue factor of the pipe network from the second model.

In some embodiments, the processor 112 may detect the vibration time of the pipe network through the sensor. For example, the processor 112 may detect through the sensor that the pipe network vibrates at a certain time period of a certain day, and determine the vibration time of the pipe network. In some embodiments, the processor 112 may obtain the vibration frequency of the pipe network through periodic detection by the sensor. For more information about the vibration frequency of the pipe network, refer to other parts of the present disclosure (for example, FIG. 4 and its related descriptions).

In some embodiments, the process of calculating the vibration fatigue factor of the pipe network may be expressed as: the vibration fatigue factor of the pipe network=the vibration frequency of the pipe network*the vibration time of the pipe network/pipe material strength.

Among then, the larger the vibration frequency of the pipe network and the vibration time of the pipe network are, the easier the pipe is to produce fatigue, and the larger the corresponding the vibration fatigue factor of the pipe network. By obtaining the vibration frequency of the pipe network and the vibration time of the pipe network, the foundation may be laid for the subsequent accurate calculation of the vibration fatigue factor of the pipe network. The pipe material strength is the ability of the pipe material to resist damage under the action of external force. In some embodiments, the pipe material strength may include tensile strength, compressive strength, shear strength, flexural strength, or the like. The smaller the pipe material strength, the easier the pipe is fatigued, and the greater the corresponding vibration fatigue factor of the pipe network. By setting the pipe material strength, the influence of different materials on the ease of fatigue of the pipe may be comprehensively considered, so as to improve the accuracy of determining the vibration fatigue factor of the pipe network.

In some embodiments, the vibration frequency of the pipe network and the vibration time of the pipe network may be input into the second model to obtain the vibration fatigue factor of the pipe network. The second model may be a CNN model, a DNN model, or the like. The second model may be trained by using historical vibration frequency of the pipe network and historical vibration time of the pipe network as training data, so that the second model may output vibration fatigue factor of the pipe network based on the vibration frequency of the pipe network and the vibration time of the pipe network. The labels of the training data may be manually-labeled vibration fatigue factors of the pipe network.

In some embodiments, the input of the maintenance time prediction model 330 may be the combination of feature information, the pipe network maintenance value, and the vibration fatigue factor of the pipe network, and the output of the maintenance time prediction model 330 is the maintenance time of the pipe network 340.

In some embodiments, as shown in FIG. 3, the model parameters of the maintenance time prediction model 330 may be obtained by training a plurality of first training samples 360 with labels. In some embodiments, the plurality of sets of first training samples 360 may be obtained based on historical data, and each set of first training samples 360 may include a plurality of training data and labels corresponding to the training data. Taking the input of the maintenance time prediction model 330 as the feature information 320-1 as an example, the training data may include feature information corresponding to historical running time and historical gas leakage information, and the label of the training data may be the manually-marked maintenance time of the pipe network. Taking the input of the maintenance time prediction model 330 as the feature information 320-1 and the pipe network maintenance value 320-2 as an example, the training data may include the feature information corresponding to the historical running time and the historical gas leakage information, and the feature information based on the historical pipe network maintenance information and the maintenance value of the pipe network obtained from the historical pipe network environment information, and the label of the training data may be the maintenance time of the pipe network marked manually. Taking the input of the maintenance time prediction model 330 as the feature information 320-1, the maintenance value of the pipe network 320-2, and the vibration fatigue factor of the pipe network 320-3 as examples, the training data may include the feature information corresponding to the historical running time and the historical gas leakage information, the historical maintenance value of the pipe network, and the vibration fatigue factor of the pipe network calculated based on the historical vibration frequency of the pipe network and historical vibration time of the pipe network. The label of the training data may be the manually-marked maintenance time of the pipe network.

The parameters of the initial maintenance time prediction model 350 may be updated through a plurality of groups of first training samples 360 to obtain the trained initial maintenance time prediction model 350. Among them parameters can be passed in any common way.

In some embodiments, the parameters of the initial maintenance time prediction model 350 may be iteratively updated based on a plurality of first training samples, so that the loss function of the model satisfies a preset condition. For example, the loss function converges, or the loss function value is smaller than a preset value. When the loss function satisfies the preset condition, the model training is completed, and the trained initial maintenance time prediction model 350 is obtained. The maintenance time prediction model 330 and the trained initial maintenance time prediction model 350 have the same model structure.

The maintenance time of the pipe network is predicted by the maintenance time prediction model, and maintenance may be carried out before the pipe network of natural gas is damaged, so as to prevent the underground pipe network from being unable to be used normally due to the full life cycle, thereby avoiding serious losses. The maintenance value of the pipe network or the vibration fatigue factor of the pipe network may be used as the input of the maintenance time prediction model to obtain a prediction result associating the feature information obtained based on the running time and gas leakage information with the maintenance value of the pipe network, or the feature information obtained based on the running time and gas leakage information with the vibration fatigue factor. It makes the maintenance time prediction model more accurate in predicting the maintenance time of the pipe network.

It should be noted that the above description about the method for predicting the process maintenance time is only for example and illustration, and does not limit the scope of application of the present disclosure. For those skilled in the art, various modifications and changes can be made to the process maintenance time prediction method under the guidance of the present disclosure. However, these corrections and changes are still within the scope of this present disclosure. For example, the input of the second model may also include pipe material strength. The vibration frequency of the pipe network, vibration time of the pipe network, and pipe material strength may be input into the second model to obtain the vibration fatigue factor of the pipe network. The second model may be a CNN model, a DNN model, or the like. The second model may be trained by using historical vibration frequency of the pipe network, historical vibration time of the pipe network and historical pipe material strength as training data, so that the second model may output the vibration fatigue factor of the pipe network based on the vibration frequency of the pipe network, the vibration time of the pipe network and pipe material strength. The labels of the training data may be manually labeled as the vibration fatigue factor of the pipe network.

Figure 4:
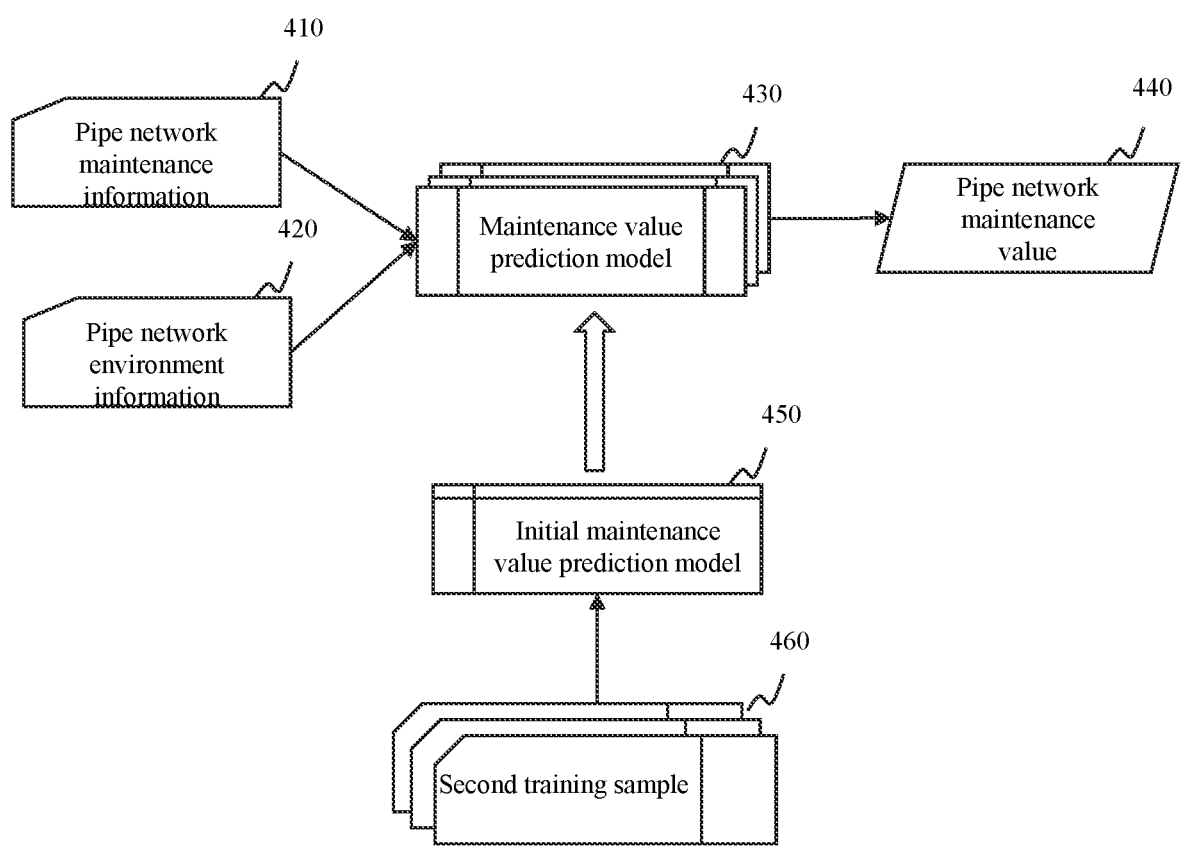
FIG. 4 illustrates an exemplary schematic diagram of a method for predicting a maintenance value according to some embodiments of the present disclosure.

FIG. 4 illustrates an exemplary schematic diagram of a method for predicting maintenance value according to some embodiments of the present disclosure. As shown in FIG. 4, the method 400 includes pipe network maintenance information 410, pipe network environment information 420, a maintenance value prediction model 430 and a pipe network maintenance value 440, and also includes an initial maintenance value prediction model 450 and a second training sample 460.

A maintenance value prediction model may be used to predict a maintenance value of the pipe network. In some embodiments, the maintenance value of the pipe network may be obtained based on the pipe network maintenance information and the pipe network environment information through a maintenance value prediction model.

In some embodiments, the maintenance value prediction model may be a Convolutional Neural Network (CNN), a Fully Convolutional neural Network (FCN) model, a Generative Adversarial Network (GAN), a Back Propagation (BP) machine learning model, a Radial Basis Function machine learning model (RBF), a Deep Belief Network (DBN), an Elman Machine learning model (EM), etc. or a combination thereof.

In some embodiments, the maintenance value prediction model may be a Graph Neural Network (GNN) model. The nodes of the GNN model are the historical maintenance locations of the pipe network and pipe network environment information, and the edges are pipes between the historical maintenance locations of the pipe network.

In some embodiments, as shown in FIG. 4, the input of the maintenance value prediction model 430 may include the pipe network maintenance information 410 and the pipe network environment information 420, and the output is the maintenance value of the pipe network 440. In some embodiments, the input to the maintenance value prediction model 430 may include historical data over a certain period of time in the past (e.g., last a month, last 2 months, last 3 months, etc.).

In some embodiments, the pipe network maintenance information may include at least one of replacement pipes, a maintenance time, specific locations for maintenance (e.g., connections, elbows, branch pipes, etc.), gas leakage after maintenance, and vibration detection results. In some embodiments, the processor 112 may obtain pipe network maintenance information based on historical maintenance records.

In some embodiments, the pipe network environment information may include the vibration frequency of the pipe network and natural gas usage environment information.

In some embodiments, the natural gas usage environment information may include an average ventilation rate of natural gas within a cell. The processor 112 may obtain natural gas usage environment information through sensor detection.

In some embodiments, the vibration frequency of the pipe network may include a natural frequency of a pipe and an external vibration frequency. The natural frequency is the frequency of vibration generated due to changes in the elbow, diameter, etc. of the pipe, and due to the flow of natural gas. The external vibration frequency may be the frequency of vibration caused by the surrounding construction site, traffic, an unstable pipe support, etc.

In some embodiments, the processor 112 may obtain the vibration frequency of the pipe network by periodically detecting the sensor. The detected historical data may be stored in the storage device 120. When predicting the maintenance value of the pipe network through the maintenance value prediction model, the data in a certain period of time in the past (for example, 1 week, 1 month, 2 months, 3 months, etc.) is selected as the model input.

In some embodiments, the length of the corresponding time period of the selection data is negatively correlated with the maintenance value of the pipe network within a certain range. For example, if the maintenance value of the pipe network is large, the priority of maintenance processing is high, and the selection of the time period may be relatively small, in order to speed up the prediction or avoid the interference of irrelevant data. For another example, the maintenance value of the pipe network is small, the priority of maintenance processing is low, and the selection of the time period may be relatively large to ensure the prediction effect.

In some embodiments, the GNN model may process graph data constructed based on the relationship between the maintenance historical pipe network locations and historical pipe network environmental information to determine maintenance values of the pipe network. In some embodiments, the graph may include a plurality of nodes and a plurality of edges, where nodes correspond to the historical maintenance locations of the pipe network and pipe network environment information, and edges correspond to pipes between the historical maintenance locations. In some embodiments, the edge corresponds to the spatial position relationship between the historical pipe network maintenance locations and the pipe network environment information, and the spatial position relationship may be a relative position relationship, a distance relationship, or the like. In some embodiments, nodes and edges each contain their own features. In some embodiments, the features of the nodes may include replacement pipes, maintenance time, specific maintenance locations, gas leakage after maintenance, vibration detection results, vibration frequencies of the pipe network, and natural gas usage environment information, or the like. The feature of each edge may include the pipe material, diameter, connection method, and the relationship between the pipe network environment information and the pipe network maintenance location (for example, the correspondence between a maintenance point and a pipe network environment information).

In some embodiments, as shown in FIG. 4, the output of the maintenance value prediction model 430 is the maintenance value of the pipe network 440.

In some embodiments, as shown in FIG. 4, the parameters of the maintenance value prediction model 430 may be obtained by training a plurality of labeled second training samples 460. In some embodiments, a plurality of sets of second training samples 460 may be obtained, each set of second training samples 460 may include a plurality of training data and labels corresponding to the training data, and the training data may include historical pipe network maintenance information and historical pipe network environment Information, among which, the historical pipe network maintenance information and historical pipe network environment information are the pipe network maintenance information and pipe network environment information in the historical time period, and the label of the training data may be the pipe network maintenance value directly marked manually according to the maintenance record.

The parameters of the initial maintenance value prediction model 450 may be updated by a plurality of groups of second training samples 460, and the trained maintenance value prediction model 450 is obtained.

In some embodiments, the parameters of the initial maintenance value prediction model 450 may be iteratively updated based on a plurality of second training samples, so that the loss function of the model satisfies a preset condition. For example, the loss function converges, or the loss function value is smaller than a preset value. When the loss function satisfies the preset condition, the model training is completed, and the trained initial maintenance value prediction model 450 is obtained. The maintenance value prediction model 430 and the trained initial maintenance value prediction model 450 have the same model structure.

By the maintenance value prediction model, the maintenance value of the pipe network is predicted, the maintenance value of the pipe network may be used as the input of the maintenance time prediction model, to obtain the feature information obtained based on the running time and the leakage information and the maintenance value of the pipe network. Interrelated prediction results make the maintenance time prediction model more accurate in predicting the maintenance time of the pipe network.

Figure 5:
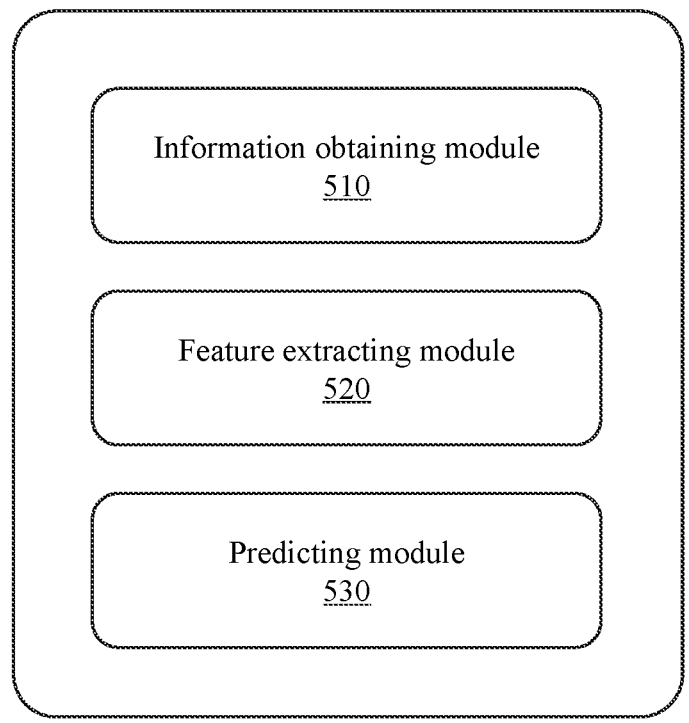
FIG. 5 illustrates an exemplary module diagram of a system for managing a pipe network of natural gas according to some embodiments of the present disclosure.

FIG. 5 illustrates an exemplary module diagram of a system for managing a pipe network of natural gas according to some embodiments of the present disclosure. As shown in FIG. 5, the system for managing pipe network of natural gas 500 may at least include an information obtaining module 510, a feature extracting module 520 and a predicting module 530.

The information obtaining module 510 may be used to obtain pipe network information of natural gas in at least one area, the pipe network information including a running time of a system of the pipe network of the natural gas and gas leakage information of the pipe network. Among them, for more details about the natural gas pipe network information, refer to FIG. 2 and its related descriptions.

The feature extracting module 520 may be used to extract feature information based on running time and the gas leakage information. Among them, for more details about the feature information, refer to FIG. 2 and its related descriptions.

The time predicting module 530 may be used to predict a maintenance time of the pipe network by inputting the feature information into a maintenance time prediction model. In some embodiments, the input of the maintenance time prediction model of the time prediction module 530 further includes a pipe network maintenance value; the pipe network maintenance value is obtained through the maintenance value prediction model based on the pipe network maintenance information and the pipe network environment information. In some embodiments, the pipe network environment information of the time prediction module 530 includes the vibration frequency of the pipe network and the natural gas usage environment information. The pipe network maintenance information comprises at least one of a replacement pipe material, a maintenance time, a specific location of the maintenance, a gas leakage after the maintenance or a result of vibration detection. In some embodiments, the input of the maintenance time prediction model of the time prediction module 530 further includes a vibration fatigue factor of the pipe network, and the vibration fatigue factor of the pipe network is calculated based on the vibration frequency of the pipe network and the vibration time of the pipe network. For more details on the maintenance time prediction model, refer to FIG. 3 and its related description.

It should be noted that the above description of the system and its modules is only for the convenience of description, and cannot limit the present disclosure to the scope of the illustrated embodiments. It can be understood that for those skilled in the art, after understanding the principle of the system, various modules may be combined arbitrarily, or a subsystem may be formed to connect with other modules without departing from the principle. In some embodiments, the information obtaining module 510, the feature extracting module 520 and the predicting module 530 disclosed in FIG. 1 may be different modules in a system, or may be a module that implements the functions of the above two or more modules. For example, each module may share one storage module, and each module may also have its own storage module. Such deformations are within the scope of protection of the present disclosure.

Figure 6:
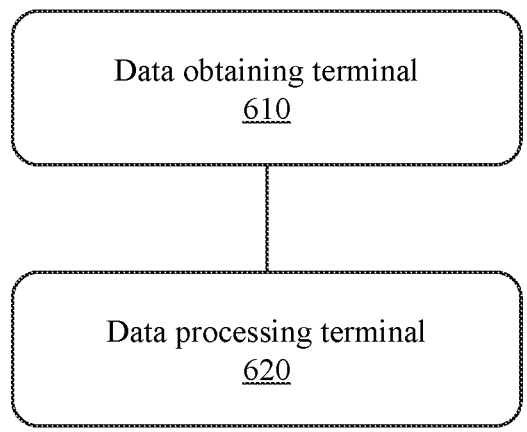
FIG. 6 illustrates another schematic diagram of a system for managing a pipe network of natural gas according to some embodiments of the present disclosure.

FIG. 6 is another schematic diagram of a natural gas pipe network management system according to some embodiments of the present disclosure. As shown in FIG. 6, the system for managing pipe network of natural gas 600 may include a data obtaining terminal 610 and a data processing terminal 620, and the data obtaining terminal 610 is connected in communication with the data processing terminal 620.

In some embodiments, the data processing terminal 620 may be a desktop computer, a tablet computer, a notebook computer, a mobile phone, or other data obtaining terminals that can realize data processing and data communication, which is not limited.

Figure 7:
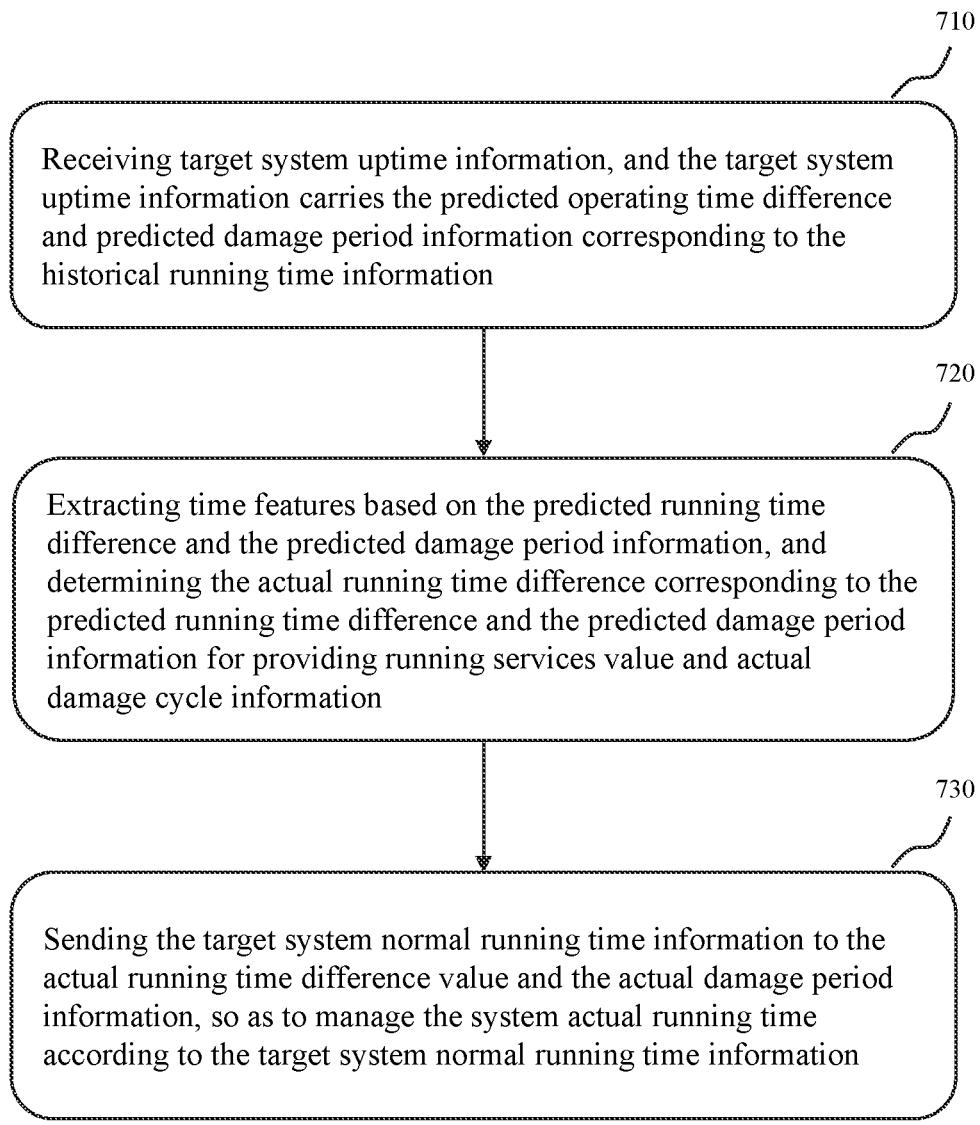
FIG. 7 illustrates another exemplary flow diagram of a method for managing a pipe network of natural gas according to some embodiments of the present disclosure.

FIG. 7 illustrates another exemplary flow diagram of a method for managing a pipe network of natural gas according to some embodiments of the present disclosure. As shown in FIG. 7, the method for managing pipe network of natural gas may be applied to the data processing terminal 620 in FIG. 6. Further, the method for managing pipe network of natural gas 700 may include the content described in the following operation 710 to operation 730.

In operation 710, receiving target system uptime information, and the target system uptime information carries the predicted operating time difference and predicted damage period information corresponding to the historical running time information.

In operation 720, extracting time features based on the predicted running time difference and the predicted damage period information, and determining the actual running time difference corresponding to the predicted running time difference and the predicted damage period information for providing running services value and actual damage cycle information.

In operation 730, sending the target system normal running time information to the actual running time difference value and the actual damage period information, so as to manage the system actual running time according to the target system normal running time information.

It can be understood that, when executing the content described in the above-mentioned operation 710 to operation 730, the target system uptime information is received, and the target system uptime information carries the predicted running time difference and prediction corresponding to the historical running time information and damage cycle information; extracting time features according to the predicted running time difference and predicted damage cycle information, and determining the actual running time difference and actual damage cycle information for providing operation services corresponding to the predicted running time difference and predicted damage cycle information; the target system uptime information is sent to the actual running time difference and the actual damage period information, so as to manage the actual system running time according to the target system uptime information. The life cycle of the system is predicted with the same method as above, so that it can be replaced in a non-working state, which effectively saves time and reduces costs.

Based on above-mentioned foundation, before receiving target system uptime information, described method further comprises the content described in following operation A1-operation A5:

In operation A1, receiving the coefficient corresponding to the actual running time of the system; wherein, the coefficient value of the actual running time of the system is carried in the coefficient corresponding to the actual running time of the system.

In operation A2, according to described coefficient value, assign described predicted running time difference value and described predicted damage period information to described system actual running time.

In operation A3, according to described coefficient value, determine described actual running time difference value and described actual damage cycle information.

In operation A4, adding the mapping relationship between the predicted running time difference, the predicted damage period information and the actual running time difference, the actual damage period information into the time feature.

In operation A5, according to described coefficient value and described actual operation time difference value, described actual damage cycle information distribution described system actual running time and system actual running time mark.

It can be understood that, when executing the described content of above-mentioned operation A1-operation A5, before receiving the target system uptime information, the coefficient is effectively monitored, so that the received target system uptime information may be guaranteed previous accuracy.

Based on above-mentioned foundation, also include the content described in following operation A21- operation A26:

In operation A21, according to the coefficient value, assign the historical running time average value corresponding to the predicted running time difference value to the actual running time of the system.

In operation A22, wherein the determining the actual running time difference value and the actual damage period information according to the coefficient value includes:

In operation A23, for each actual damage period information, determine an actual running time difference and an actual damage period information according to the coefficient value.

In operation A24, wherein the mapping relationship between the predicted running time difference, the predicted damage period information, the actual running time difference, and the actual damage period information is added to the time features include:

In operation A25, adding the mapping relationship between the predicted damage period information and the historical running time average value into the time feature.

In operation A26, adding the mapping relationship between the predicted running time difference, each actual damage period information, the actual running time difference corresponding to each actual damage period information, and the actual damage period information to the time feature.

It can be understood that when executing the content described in the above-mentioned operation A21-operation A26, the historical record is queried, so that the life cycle can be more accurately judged according to the historical record.

In the actual operation process, the inventor found that when the time feature was extracted according to the predicted running time difference value and the predicted damage period information, there was a problem of feature extraction error, so that it was difficult to accurately determine the predicted running time. The actual running time difference and the actual damage period information used to provide the operation service corresponding to the time difference value and the predicted damage period information. Extracting time features from the predicted damage period information, and determining the actual running time difference value and actual damage period information corresponding to the predicted running time difference value and the predicted damage period information for providing the operation service, the specific operations may include the following operations as described in operation A261 and operation A262.

In operation A261, according to the mapping relationship between the predicted damage period information and the historical running time average value, determining the historical running time average value corresponding to the predicted damage period information.

In operation A262, according to the historical running time average value, extracting time feature respectively, obtaining the actual running time difference and the actual damage period information corresponding to each actual damage period information.

It can be understood that, when executing the content described in the above-mentioned in operations A261 and A262, when the time feature is extracted according to the predicted running time difference and the predicted damage period information, the problem of feature extraction errors is avoided, therefore, user can accurately determine the actual running time difference and actual damage period information for providing the operation service corresponding to the predicted running time difference and the predicted damage period information.

In the actual operation process, the inventor found that when the first running time calculation model was also carried in the coefficient corresponding to the actual running time of the system, there was a problem of model calculation error, so that it was difficult to reliably calculate the coefficient value is to allocate the predicted running time difference value and the predicted damage period information to the actual running time of the system. In order to improve the above technical problem, the coefficient corresponding to the actual running time of the system described in operation A2 also carries the first running time calculation model, the operation of allocating the predicted running time difference value and the predicted damage period information according to the coefficient value for the actual running time of the system may specifically include the content described in the following operations Q1-Q5.

In operation Q1, according to the coefficient value, the first running time calculation model to allocate the predicted running time difference value and the predicted damage period information for the actual running time of the system.

In operation Q2, determining the actual running time difference value and the actual damage period information according to the coefficient value, including:

In operation Q3, according to the coefficient value, the first running time calculation model to determine the actual running time difference value and the actual damage cycle information.

In operation Q4, adding the mapping relationship between the predicted running time difference, the predicted damage period information and the actual running time difference, and the actual damage period information into the time feature include.

In operation Q5, the mapping relationship between the predicted running time difference, the predicted damage period information and the actual running time difference, the actual damage period information, and the first running time calculation model add to the temporal feature.

It can be understood that, when carrying out the content described in above-mentioned operation Q1-operation Q5, when also carrying the first running time calculation model in the coefficient corresponding to the actual running time of the system, the problem of model calculation error is avoided, therefore, the predicted running time difference value and the predicted damage period information can be reliably allocated to the actual running time of the system according to the coefficient value.

Based on above-mentioned foundation, also comprise the content described in following operations W1-W5:

In operation W1, receiving replacement system time information, and described replacement system time information carries the second running time calculation model and system actual running time mark.

In operation W2, determining the coefficient value of the actual running time of the system according to the actual running time of the system.

In operation W3, according to the coefficient value and the second running time calculation model, assigning the actual damage period information and the actual damage parameter to the actual running time of the system.

In operation W4, determining the replacement time error coefficient value corresponding to the actual running time difference value according to the coefficient value and the second running time calculation model.

In operation W5, adding the mapping relationship between the actual damage period information, the actual damage parameter and the actual running time difference, the replacement time error coefficient value, and the second running time calculation model to the time feature.

It can be understood that, when carrying out the described content of above-mentioned operation W1-operation W5, by calculating, may carry out accurate extraction to time feature, just may obtain the accurate time information of life cycle like this.

Based on above-mentioned foundation, also comprise the content described in following operation W21-operation W23:

In operation W21, monitoring the state of the actual system running time corresponding to the system actual running time mark.

In operation W22, when determining that the valid period corresponding to the actual running time of the system arrives, release the actual running time of the system.

In operation W23, removing the mapping relationship described in the time feature.

It can be understood that when carrying out the described content of above-mentioned operation W21 and operation W23, the limited equipment of equipment may be obtained reliably, and timely replacement is carried out, thus effectively reducing cost.

Based on above-mentioned foundation, described target system normal running time information also carries user identification, in according to described predicted running time difference value and described predicted damage period information extraction time feature, determining described predicted running time difference value and all Before the actual running time difference and the actual damage period information corresponding to the predicted damage period information for providing the running service, the following operations Y1 and operation Y2 are also included.

In operation Y1, according to described user identification, described target system uptime information is authenticated.

In operation Y2, when the authentication is passed, extracting time features according to the predicted running time difference and the predicted damage period information, and determining the actual running time difference and actual damage period information for providing the running service corresponding to the predicted running time difference and the predicted damage period information.

It can be understood that, when carrying out the content described in above-mentioned operation Y1 and operation Y2, the error range may be calculated by actual difference and predicted difference, so that the accurate life cycle accuracy may be improved.

In the actual operation process, the inventor found that the target system uptime information is a write data request, and the write data request further includes the data to be written. The sending the target system uptime information to the actual running time difference and the actual damage period information, in order to improve the above technical problem, the target system uptime information described in operation Q2 is write data request. The write data request further includes the data to be written, and the step of sending the target system normal running time information to the actual running time difference value and the actual damage period information may specifically include the content described in operation Q21.

In operation Q21, sending the data to be written to the actual running time difference value and the actual damage period information to replace the data corresponding to the actual running time identifier of the system.

It can be understood that, when executing the content described in above-mentioned operation Q21, it can be changed in time and effectively, effectively saving time cost.

Based on the same inventive concept, also provide a comprehensive management system for the life cycle of a natural gas energy metering Internet of Things system, including: a user platform, a service platform, a management platform, a sensor network platform and a perception control platform, the user platform It is communicatively connected to the service platform, the service platform is communicatively connected to the management platform, the management platform is communicatively connected to the sensor network platform, the sensor network platform is communicatively connected to the perception control platform, and the management platform further includes a data obtaining terminal and a data processing terminal, the data obtaining terminal and the data processing terminal are connected in communication, and the data processing terminal is specifically used for:

Receiving target system uptime information, the target system uptime information carrying the predicted running time difference and predicted damage period information corresponding to the historical running time information;

Extracting time features according to the predicted running time difference and the predicted damage period information, and determining the actual running time difference and the actual running time difference corresponding to the predicted running time difference and the predicted damage period information for providing running services damage cycle Information;

Sending the target system uptime information to the actual uptime difference value and the actual damage period information, to manage the system actual uptime according to the target system uptime information.

Figure 8:
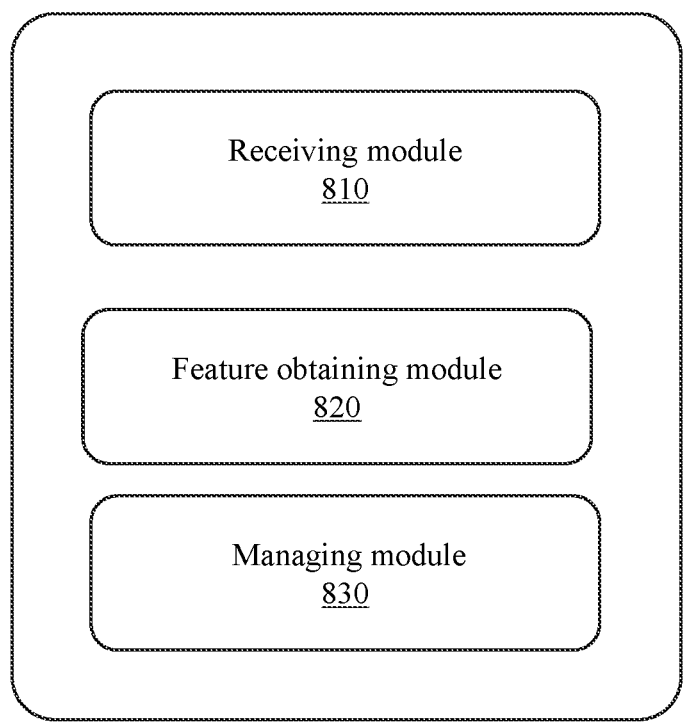
FIG. 8 illustrates a module diagram of a device for managing a pipe network of natural gas according to some embodiments of the present disclosure.

FIG. 8 illustrates a module diagram of a device for managing a pipe network of natural gas according to some embodiments of the present disclosure.

Receiving module 810 is configured to receive target system uptime information, and the target system uptime information carries the predicted running time difference and predicted damage period information corresponding to the historical running time information;

The feature obtaining module 820 is configured to extract time features according to the predicted running time difference and the predicted damage period information, and determining the actual running time difference and actual damage period information for providing the operation service corresponding to the predicted running time difference and the predicted damage period information;

The managing module 830 is configured to send the target system normal running time information to the actual running time difference value and the actual damage period information, so as to manage the system actual running time according to the target system normal running time information.

A comprehensive management system for the life cycle of a natural gas energy metering Internet of Things method and system provided in some embodiments of the present disclosure, by receiving target system uptime information, the target system uptime information carries the predicted running time difference corresponding to the historical running time information and predicted damage period information; extracting the time feature according to the predicted running time difference and the predicted damage period information, and determining the actual running time difference and actual damage period information corresponding to the predicted running time difference and the predicted damage period information for providing operation services; sending the target system uptime information to the actual uptime difference and actual damage period information to manage the actual system uptime based on the target system uptime information. The system life cycle may be predicted by the above method, and maintenance may be carried out in the non-working state, which effectively saves time and reduces costs.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of the present disclosure are not necessarily all referring to the same embodiment. Furthermore, the particular features, structures or characteristics may be combined as suitable in one or more embodiments of the present disclosure.

Additionally, the order in which elements and sequences of the processes described herein are processed, the use of alphanumeric characters, or the use of other designations, is not intended to limit the order of the processes and methods described herein, unless explicitly claimed. While various presently contemplated embodiments of the invention have been discussed in the foregoing disclosure by way of example, it is to be understood that such detail is solely for that purpose and that the appended claims are not limited to the disclosed embodiments, but, on the contrary, are intended to cover all modifications and equivalent arrangements that are within the spirit and scope of the embodiments herein. For example, although the system components described above may be implemented by hardware devices, they may also be implemented by software-only solutions, such as installing the described system on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

For each patent, patent present disclosure, patent present disclosure publications and other materials referenced in the present disclosure, such as articles, books, instructions, publications, documents, etc., here, all of them will be incorporated herein by reference. Except for the present disclosure history documentation of the present disclosure or the conflict, there is also an except for documents (current or after the present disclosure), which are available in the present disclosure.

Finally, it should be understood that the embodiments described in the present disclosure are intended to illustrate the principles of the embodiments of the present disclosure. Other deformations may also belong to the scope of the present disclosure. Thus, as an example, not limited, the alternative configuration of the present disclosure embodiment can be consistent with the teachings of the present disclosure. Accordingly, the embodiments of the present disclosure are not limited to the embodiments of the present disclosure clearly described and described.

We claim:

1. A method for managing a pipe network of natural gas, implemented on a computing device including a storage device and at least one processor, the method comprising:
   obtaining pipe network information of natural gas in at least one area, the pipe network information including a running time of a system of the pipe network of the natural gas and gas leakage information of the pipe network;
   extracting feature information based on the running time and the gas leakage information; and
   predicting a maintenance time of the pipe network by inputting the feature information into a maintenance time prediction model, wherein an input of the maintenance time prediction model further comprises a pipe network maintenance value, and the pipe network maintenance value is obtained through a maintenance value prediction model based on pipe network maintenance information and pipe network environment information; wherein
   the maintenance value prediction model is a Graph Neural Network model, a plurality of nodes of the Graph Neural Network model include a plurality of historical maintenance locations of the pipe network and historical pipe network environmental information, a plurality of edges of the Graph Neural Network model include one or more pipes between the plurality of historical maintenance locations of the pipe network, the features of the nodes include replacement pipe material, maintenance time, a maintenance location, gas leakage after maintenance, a vibration detection result, vibration frequency of the pipe network, and natural gas usage environment information, and features of edges include pipe material, diameter, connection manner, and relationship between the pipe network environment information and maintenance locations of the pipe network; and
   the input of the maintenance time prediction model further comprises a vibration fatigue factor of the pipe network; the vibration fatigue factor of the pipe network is obtained by inputting the vibration frequency of the pipe network, vibration time of the pipe network, and pipe material strength into a second model, the second model is a Deep Neural Network model, and the second model is obtained by training based on historical vibration frequency of the pipe network, historical vibration time of the pipe network, and historical pipe material strength.

2. The method of claim 1, wherein the pipe network environment information comprises the vibration frequency of the pipe network and the natural gas usage environment information; the pipe network maintenance information comprises at least one of a replacement pipe material, the maintenance time, the maintenance location, the gas leakage after maintenance, or the vibration detection result.

3. The method of claim 2, wherein the vibration frequency of the pipe network includes a natural frequency of a pipe and an external vibration frequency.

4. The method of claim 3, wherein the natural frequency of the pipe is a frequency of vibration generated due to changes in an elbow or a diameter of the pipe, or due to the flow of the natural gas, and the external vibration frequency is the frequency of vibration caused by a surrounding construction site, traffic, an unstable pipe support.

5. A system for managing a pipe network of natural gas, comprising:
   at least one storage medium storing a set of instructions; and
   at least one processor in communication with the at least one storage medium to execute the set of instructions to perform operations comprising:
   obtaining pipe network information of natural gas in at least one area, the pipe network information including a running time of a system of the pipe network of the natural gas and gas leakage information of the pipe network;
   extracting feature information based on the running time and the gas leakage information; and
   predicting a maintenance time of the pipe network by inputting the feature information into a maintenance time prediction model, wherein an input of the maintenance time prediction model further comprises a pipe network maintenance value, and the pipe network maintenance value is obtained through a maintenance value prediction model based on pipe network maintenance information and pipe network environment information; wherein the maintenance value prediction model is a Graph Neural Network model, a plurality of nodes of the Graph Neural Network model include a plurality of historical maintenance locations of the pipe network and historical pipe network environmental information, a plurality of edges of the Graph Neural Network model include one or more pipes between the plurality of historical maintenance locations of the pipe network, the features of the nodes include replacement pipe material, maintenance time, a maintenance location, gas leakage after maintenance, a vibration detection result, vibration frequency of the pipe network, and natural gas usage environment information, and features of edges include pipe material, diameter, connection manner, and relationship between the pipe network environment information and maintenance locations of the pipe network; and the input of the maintenance time prediction model further comprises a vibration fatigue factor of the pipe network; the vibration fatigue factor of the pipe network is obtained by inputting the vibration frequency of the pipe network, vibration time of the pipe network, and pipe material strength into a second model, the second model is a Deep Neural Network model, and the second model is obtained by training based on historical vibration frequency of the pipe network, historical vibration time of the pipe network, and historical pipe material strength.

6. The system of claim 5, wherein the pipe network environment information comprises the vibration frequency of the pipe network and the natural gas usage environment information; and the pipe network maintenance information comprises at least one of a replacement pipe material, the maintenance time, the maintenance location, the gas leakage after maintenance, or the vibration detection result.

7. The system of claim 6, wherein the vibration frequency of the pipe network includes a natural frequency of a pipe and an external vibration frequency.

8. The system of claim 7, wherein the natural frequency of the pipe is a frequency of vibration generated due to changes in an elbow or a diameter of the pipe, or due to the flow of the natural gas, and the external vibration frequency is the frequency of vibration caused by a surrounding construction site, traffic, an unstable pipe support.

9. A non-transitory computer readable medium storing instructions, when executed by at least one processor, causing the at least one processor to implement a method comprising:

obtaining pipe network information of natural gas in at least one area, the pipe network information including a running time of a system of the pipe network of the natural gas and gas leakage information of the pipe network;

extracting feature information based on the running time and the gas leakage information; and predicting a maintenance time of the pipe network by inputting the feature information into a maintenance time prediction model, wherein an input of the maintenance time prediction model further comprises a pipe network maintenance value, and the pipe network maintenance value is obtained through a maintenance value prediction model based on pipe network maintenance information and pipe network environment information; wherein the maintenance value prediction model is a Graph Neural Network model, a plurality of nodes of the Graph Neural Network model include a plurality of historical maintenance locations of the pipe network and historical pipe network environmental information, a plurality of edges of the Graph Neural Network model include one or more pipes between the plurality of historical maintenance locations of the pipe network, the features of the nodes include replacement pipe material, maintenance time, a maintenance location, gas leakage after maintenance, a vibration detection result, vibration frequency of the pipe network, and natural gas usage environment information, and features of edges include pipe material, diameter, connection manner, and relationship between the pipe network environment information and maintenance locations of the pipe network; and the input of the maintenance time prediction model further comprises a vibration fatigue factor of the pipe network; the vibration fatigue factor of the pipe network is obtained by inputting the vibration frequency of the pipe network, vibration time of the pipe network, and pipe material strength into a second model, the second model is a Deep Neural Network model, and the second model is obtained by training based on historical vibration frequency of the pipe network, historical vibration time of the pipe network, and historical pipe material strength.

* * * * *